United States Patent [19]

Onozaki

[11] 4,344,634
[45] Aug. 17, 1982

[54] COMPRESSION RINGS
[75] Inventor: Teruo Onozaki, Tokyo, Japan
[73] Assignee: Nippon Piston Ring Co., Ltd., Tokyo, Japan
[21] Appl. No.: 212,967
[22] Filed: Dec. 4, 1980
[30] Foreign Application Priority Data Dec. 4, 1979 [JP] Japan .................. 54-157294

[51] Int. Cl.³ .............................................. H01F 1/04
[52] U.S. Cl. ..................... 277/236; 277/DIG. 6; 75/126 R
[58] Field of Search ............... 277/236, DIG. 6; 75/126 R, 123 L, 123 N

[56] References Cited
U.S. PATENT DOCUMENTS

| 3,539,192 | 11/1970 | Prasse | 277/236 |
| 3,847,678 | 11/1974 | Furr | 75/126 R |
| 4,079,720 | 3/1978 | Takahashi | 277/DIG. 6 |
| 4,094,514 | 6/1978 | Johnson | 277/236 |
| 4,255,215 | 3/1981 | Rauch | 75/126 R |
| 4,265,660 | 5/1981 | Giflo | 75/123 L |

FOREIGN PATENT DOCUMENTS 52-31264  3/1977  Japan .................. 277/DIG. 6

*Primary Examiner*—Robert I. Smith
*Attorney, Agent, or Firm*—Sughrue, Mion, Zinn, Macpeak & Seas

[57] ABSTRACT

A compression ring composed of stainless steel comprising from 0.6 to 0.7% by weight C, from 0.15 to 0.40% by weight Si, from 0.6 to 0.8% by weight Mn, from 12.0 to 14.0% by weight Cr, and the balance of Fe and impurities, wherein a running face of the ring which slides the cylinder wall has a surface treated layer. This compression ring has excellent heat collapse resistance and excellent wear resistance on upper and lower sides.

2 Claims, 8 Drawing Figures

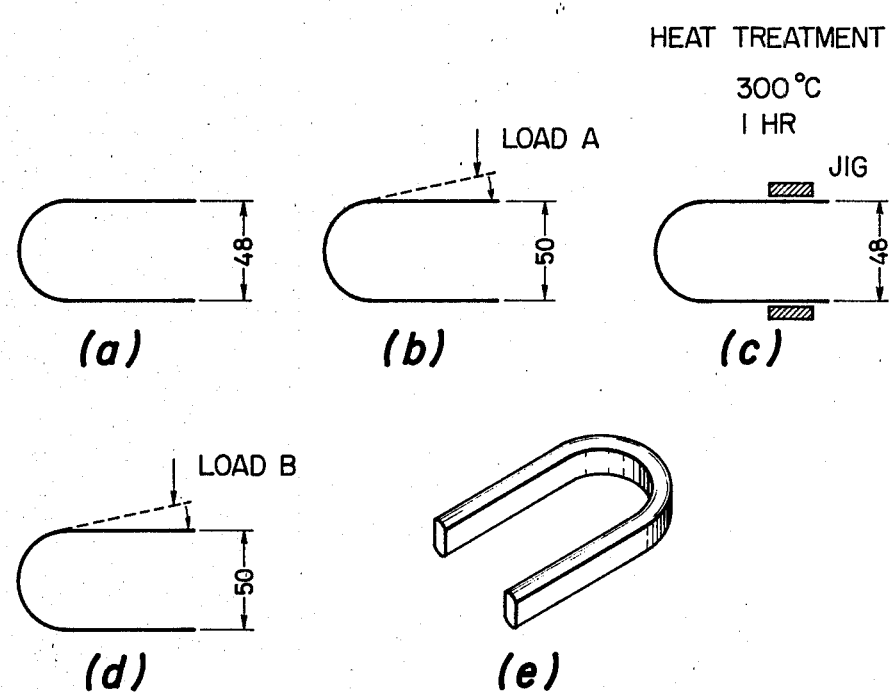

COMPRESSION RINGS

BACKGROUND OF THE INVENTION

The present invention relates to piston rings and particularly to compression rings suitable for applying to internal combustion engines.

Recently, high efficiency has become more and more desirable for internal combustion engines. In addition, it has become necessary to consider the treatment of exhaust gas. Thus, great consideration has been given to the problems caused by increases in fuel costs and the lowering of power of internal combustion engines. With respect to these problems, compression rings for keeping the combustion chamber of the internal combustion engine airtight have a large influence upon the efficiency of the internal combustion engines. It has thus become necessary to consider the characteristics of such compression rings.

Heretofore, cast iron rings or oil temper wires composed of carbon steel or silicon-chromium steel have been used as compression rings for internal combustion engines. In the cast iron rings, however, it is difficult to produce rings which are thin in the axis direction. Because of poor strength at a high temperature in the silicon-chromium rings, it is necessary that the cross-sectional area be relatively large, and thus the weight becomes large. Therefore, they have disadvantages that the inertia is large and a fluttering phenomenon (extraordinary vibration of rings) which causes leakage of fuel gas easily occurs. Furthermore, with respect to both the cast iron rings and the silicon-chromium rings, since heat collapse resistance and wear resistance in upper and lower sides, i.e., sides perpendicular with respect to the axial direction are insufficient, it is impossible to fit the ring on a position near the top of the piston so as to be advantageous for a countermeasure for exhaust gas, and that, since the interval between the rings cannot be shortened, the weight of the piston increases and high efficiency cannot be attained.

SUMMARY OF THE INVENTION

The object of the present invention is to provide compression rings having high strength as compared with previously used rings, and having excellent heat collapse resistance and excellent wear resistance on upper and lower sides, which are capable of providing high output and high speed in internal combustion engines while also providing good airtightness and without causing a fluttering phenomenon.

More particularly, the compression rings of the present invention have high strength at a high temperature, excellent heat collapse resistance and excellent wear resistance on upper and lower sides, which are composed of martensitic stainless steel comprising (as an alloy composition) from 0.6 to 0.7% by weight C, from 0.15 to 0.40% by weight Si, from 0.6 to 0.8% by weight Mn, from 12.0 to 14.0% by weight Cr, and the balance of iron and impurities, and are used after heat treatment, wherein Cr carbide is distributed in 5 to 13 area % and, wherein a running face of the ring which slides against the cylinder wall has a surface treated layer.

BRIEF DESCRIPTION OF THE DRAWINGS

FIGS. 4 (a) to (e) are illustrations showing a method of measuring heat collapse resistance used in the present invention.

Figure 1:
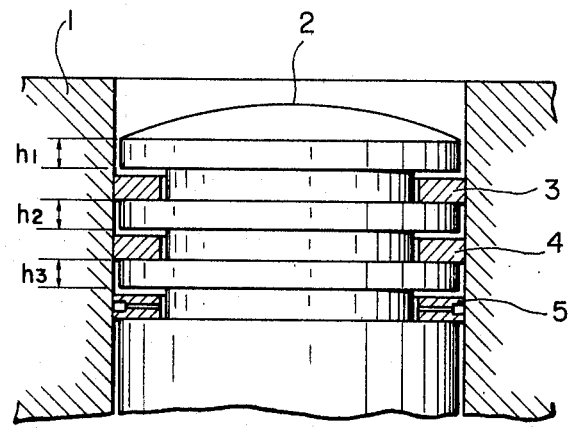
FIG. 1 is a partial sectional view of an internal combustion engine fitting with piston rings.

In the drawings, 1 is a cylinder, 2 is a piston, 3 and 4 are compression rings, 5 is an oil ring, 6 is an end clearance, 7 is a running face, and 8 is a surface treated layer.

DETAILED DESCRIPTION OF THE INVENTION

The term "area %" used herein indicates percentage of the area occupied by a given component of an alloy based on the total area of a section of the alloy.

In the following description, compression rings according to the present invention are described for convenience by reference to the drawings.

Figure 2:
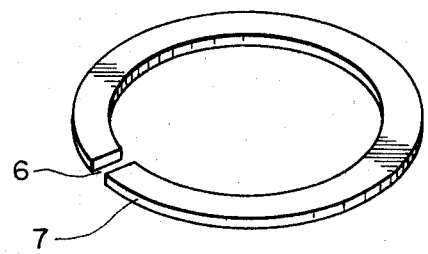
FIG. 2 is a perspective view of a compression ring.

FIG. 1 is a partial sectional view of an internal combustion engine fitting with piston rings, and FIG. 2 is a perspective view of a compression ring. Though the compression rings are necessary to be excellent in airtightness, wear resistance, scuffing resistance and anti-breakage, it is further desired to improve them in order to obtain higher output and higher speeds in the internal combustion engines.

Figure 3:
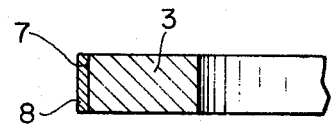
FIG. 3 is a partial sectional view of a compression ring of the present invention.

In the present invention, in order to be able to increase the rate of revolution of the internal combustion engine without causing the fluttering phenomenon, it has been intended to increase the strength of the rings and to reduce the width of rings as compared with the previously used cast iron rings and silicon-chromium rings. In order to reduce the position of compression rings for a countermeasure concerning exhaust gas or high output, i.e., for cancelling or minimizing increase in loads to be imposed on functional members of internal combustion engines, for example, compression rings, pistons, liners, etc., as a result of measures taken for the reduction or detoxification of exhaust gases or for the obtention of higher output, it has been intended to increase the strength of the rings and to reduce the width of the rings, as compared with the prior cast iron rings or silicon-chromium rings. Further, in order to maintain good efficiency of the internal combustion engines even under high output and high speed, the heat collapse resistance and the wear resistance in upper and lower sides have been particularly considered in the compression rings. A partial sectional view of the compression ring is shown in FIG. 3. The compression ring 3 or 4 of the present invention is composed of stainless steel having an alloy composition having components as described hereinafter. In the surface of the compression ring, at least the running face 7, which is a face sliding the cylinder wall, has a surface treated layer 8.

The reasons for restricting the composition of the compression rings according to the present invention are explained below.

C provides high strength and wear resistance, but at least 0.6% by weight C is required for such purposes. However, if the C content is large, processing properties with respect to bending deteriorate, and molding of the ring becomes difficult. Therefore, the upper limit is 0.7% by weight.

Si has the effect of increasing heat collapse resistance and wear resistance in upper and lower sides, and at least 0.15% by weight Si is required for these purposes. However, the upper limit is 0.40% by weight, because the plating property is damaged when the Si content exceeds 0.40% by weight.

Mn is incorporated as a deoxidizer and has a function of changing into the form of sulfide. Therefore, 0.6% by weight or more is necessary for obtaining a suitable sulfide form in the compression ring. However, the upper limit is 0.8% by weight, because the plating property is damaged when the Mn content exceeds 0.8% by weight, as in the case of Si.

Cr combines with C to form carbide, by which heat collapse resistance and corrosion resistance are improved simultaneously with scuffing resistance. Further, it is effective for improving the wear resistance in upper and lower sides. However, if the Cr content exceeds 14.0% by weight, the hardness after heat treatment lowers and a molding property deteriorates. On the other hand, when the Cr content is less than 12.0% by weight, martensite is converted to ferrite and a predetermined hardness cannot be obtained. Therefore, the Cr content is in the range of from 12.0 to 14.0% by weight in view of the C content.

In the present invention, C and Cr are incorporated in the above-described amounts. After heating to from about 1,000° to 1,100° C., the compression ring is quenched and subjected thereafter to tempering at 550° to 650° C. to form a structure where Cr carbide is precipitated in 5 to 13 area %. At the same time, a surface heat-treatment layer 8 which is hard and excellent in scuffing resistance is provided on a part of the compression ring where wear resistance and scuffing resistance are required, namely, on the face which slides the cylinder wall. As the surface treatment, it is possible to suitably utilize conventional hard Cr plating, porous Cr plating, compound plating, Cr spraying, Mo spraying and other conventional surface treatments. Particularly, in the case in which the surface treated layer is a hard Cr plating layer, the running face of the compression ring which slides the cylinder wall has $H_RC$ [Rockwell hardness C scale according to JIS-Z-2245 (1976)] of 62 or more and low friction coefficient, and it exhibits good airtightness as the face of the compression ring, because of being excellent in wear resistance, scuffing resistance, and corrosion resistance. Further, because of cooperative function of good airtightness (which is caused by self tension of the compression ring) by excellent heat collapse resistance, high tensile strength at a high temperature and excellent wear resistance on upper and lower sides, as described above, the compression rings of the present invention exhibit excellent ability as compression rings. Moreover, in the circumferential face of the compression ring, it is necessary to have a surface treated layer on at least the face of the compression ring which slides the cylinder wall. The surface treated layer may be provided, if desired, on the upper side and the lower side of the compression ring, in addition to the running face.

EXAMPLE 1

In the following, the effect of the present invention is illustrated with reference to specific rings. Chemical compositions of rings according to the present invention (A and B) and previously known rings (C-cast iron; D-silicon-chromium) are shown in Table 1 in which Rings A and B are according to the present invention, Ring C is a prior art ring (cast iron) and Ring D is a prior art ring (silicon-chromium).

TABLE 1

| Ring | Components | | | | |
|---|---|---|---|---|---|
| | C | Si | Mn | Cr | Fe |
| A | 0.64 | 0.30 | 0.78 | 13.34 | bal |
| B | 0.69 | 0.33 | 0.73 | 13.81 | bal |
| C | 3.21 | 2.03 | 0.43 | — | bal |
| D | 0.54 | 1.46 | 0.52 | 0.70 | bal |

Properties after heat treatment of rings A, B, C, and D are shown in Table 2.

TABLE 2

| Ring | Hardness ($H_RC$) | Heat Collapse Resistance (%) | Tensile Strength at 300° C. (kg/mm$^2$) | Wear Resistance (mm$^3$/mm$^2$ — mm) | Area Ratio of Cr Carbide (%) |
|---|---|---|---|---|---|
| A | 39.3 | 14.6 | 110.3 | $1.64 \times 10^{-7}$ | 7.5 |
| B | 41.0 | 13.5 | 115.0 | $1.58 \times 10^{-7}$ | 8.2 |
| C | 40.3 | 42.5 | 23.4 | $4.2 \times 10^{-7}$ | 0 |
| D | 41.3 | 34.0 | 64.8 | $5.3 \times 10^{-7}$ | 0 |

The heat collapse resistance indicates ratio of reduction in load necessary to bend a rod to a predetermined radius of curvature after heat treatment. This was determined as follows. Firstly, a rod having a diameter of 5 mm and length of 150 mm was subjected to bending to have a radius of curvature of 24 mm as shown in FIGS. 4 (a) and (e) at room temperature. Upon removal of external force the radius of curvature became somewhat larger than ever due to elasticity of the rod. Next, load (A) necessary to bend the rod to have a radius of curvature of 25 mm at room temperature was measured. Then, the rod was set by jigs to have a radius of curvature of 24 mm and heat treated at 300° C. for 1 hour (FIG. 4 (c)). After the heating the rod was released and as a result the radius of curvature increased again to some extent. Thereafter, load (B) necessary to bend the rod to have a radius of curvature of 25 mm at room temperature was measured (FIG. 4 (d)). The heat collapse resistance of the rod was calculated according to the following equation:

$$\text{Heat Collapse Resistance} = \frac{\text{Load } (A) - \text{Load } (B)}{\text{Load } (A)} \times 100$$

The result shows that the smaller the reduction ratio is, the more excellent the heat collapse resistance is.

The tensile strength was determined according to the method of JIS-Z-2241 (1980).

The wear resistance was determined by measuring the wear amount measured by an Okoshi rapid wear testing machine (friction material: annealing material SCM 415 (JIS-G-4105 (1979)), friction distance: 400 m, final load: 6.8 kg, and friction rate: 1.34 m/sec.) as described in *Kikai Gakkai Ronbunshu*, Vol. 21, No. 107, pp. 555–561 (1955).

It is understood from Table 2 that the rings of the present invention are excellent in heat collapse resistance, tensile strength at a high temperature, and wear resistance on upper and lower sides. When the compression rings of the present invention are used, the internal combustion engine becomes to have high output and high speed, because not only is it possible to reduce the weight of the rings and the piston to lower the energy loss, but also airtightness and durability are improved.

EXAMPLE 2

A ring according to the present invention and a previously known ring were used as the first compression ring in the engine, respectively, and a comparison test was carried out by measuring wear amounts of the upper side and the lower side of each of them. As the ring according to the present invention, a ring having the chemical composition of ring A above was used. On the other hand, as the previously known ring, an Si-Cr steel ring was used. The running faces of both rings were subjected to conventional hard chromium plating.

| (Engine used) | |
|---|---|
| Inside diameter × stroke: | 85 φ × 78 mm |
| Total displacement: | 1,700 cc |
| Maximum output: | 98 PS/5,700 rpm |
| (Condition of examination) | |
| Fuel: | Leaded gasoline 3.1–3.2 g/gal |
| Revolution: | Full/6,000 rpm |
| Operation time: | 200 hours |

As the result, the average wear amount in the ring of the present invention was $5\mu$, while that of the prior ring was $33\mu$, by which it was ascertained that the ring of the present invention exhibited remarkably excellent wear resistance.

As described above, the compression rings of the present invention are particularly excellent in heat collapse resistance and wear resistance on the upper and lower sides and they are excellent in airtightness, scuffing resistance and anti-breakage, etc. At the same time, it is possible to reduce the weight of the compression rings and the weight of the piston. Further, it is possible not only to reduce energy loss due to inertia but also to decrease the contact area with the cylinder wall and to reduce friction loss, by which high output of the internal combustion engine can be attained simultaneously with resolving the countermeasure for exhaust gas.

While the invention has been described in detail with reference to specific embodiments thereof, it will be apparent to one skilled in the art that various changes and modifications can be made therein without departing from the spirit and scope thereof.

What is claimed is:

1. A compression ring for internal combustion engines having excellent heat collapse resistance and excellent wear resistance on upper and lower sides, said ring being composed of stainless steel comprising from 0.6 to 0.7% by weight C, from 0.15 to 0.40% by weight Si, from 0.6 to 0.8% by weight Mn, from 12.0 to 14.0% by weight Cr, and the balance of Fe and impurities, wherein a running face of the ring which slides against the cylinder wall has a surface treated layer.

2. A compassion ring as in claim 1, wherein said running face of the ring has a surface treated layer formed by hard Cr plating, porous Cr plating, compound plating, Cr spraying, or Mo spraying.

* * * * *